United States Patent [19]
Takahashi

[11] 3,812,230
[45] May 21, 1974

[54] METHOD FOR CONTINUOUSLY MAKING A HOLLOW BOARD ARTICLE OF THERMOPLASTIC RESIN

[75] Inventor: Keiichi Takahashi, Ichikawa, Japan

[73] Assignee: Takan Kogyo Company Limited, Tokyo, Japan

[22] Filed: Sept. 24, 1971

[21] Appl. No.: 183,455

[30] Foreign Application Priority Data
Sept. 29, 1970 Japan............................. 45-84671
Sept. 29, 1970 Japan............................. 45-84672

[52] U.S. Cl................ 264/89, 264/95, 264/177, 264/209, 264/210 R, 264/237, 264/348
[51] Int. Cl................ B29c 17/07, B29c 25/00
[58] Field of Search........... 264/47, 209, 95, 89, 90, 264/237, 177, 348, 210 R

[56] References Cited
UNITED STATES PATENTS
| | | | |
|---|---|---|---|
| 3,125,619 | 3/1964 | Miller | 264/348 |
| 3,296,661 | 1/1967 | De Moustier | 264/209 |
| 2,423,260 | 7/1947 | Slaughter | 264/95 |
| 2,519,375 | 8/1950 | Jargstorff et al. | 264/89 |
| 3,274,315 | 9/1966 | Kawamura | 264/209 |
| 3,264,383 | 8/1966 | Niessner et al. | 264/95 |
| 3,274,313 | 9/1966 | Harp, Jr. | 264/95 |
| 3,327,030 | 6/1967 | Reifenhauser | 264/90 |

Primary Examiner—Jeffery R. Thurlow
Attorney, Agent, or Firm—Woodhams, Blanchard and Flynn

[57] ABSTRACT

A hollow board article consisting of two opposed surface walls and integral partition walls interconnecting these two surface walls and dividing the space therebetween into a plurality of cavities can be manufactured smoothly and rapidly by an apparatus comprising an extruder having a die provided with a die opening corresponding in shape to the cross section of said hollow board article. Shape-modifying means are disposed between the extrusion die and a size-forming device for modifying the shape of the freshly extruded article. The shape-modifying means is provided with fluid supply means to cool the hollow board article emerging from the die while said article is in a hot and deformable state, and to enlarge the angle of entry thereof into the size-forming device.

6 Claims, 9 Drawing Figures

INVENTOR

KEIICHI TAKAHASHI

BY Woodhams, Blanchard & Flynn

ATTORNEYS

INVENTOR
KEIICHI TAKAHASHI
BY Woodhams, Blanchard & Flynn
ATTORNEYS

METHOD FOR CONTINUOUSLY MAKING A HOLLOW BOARD ARTICLE OF THERMOPLASTIC RESIN

BACKGROUND OF THE INVENTION

1. Field of the Invention

This invention relates to an improved method for continuously making a hollow board article of thermoplastic synthetic resin having cavities therein, and more particularly to the deformation of a hot deformable hollow board material extruded from an extruder by using a pressurized fluid to thereby facilitate the entry of such hollow board into sizing formers.

2. Description of the Prior Art

In making hollow or tubular articles of thermoplastic synthetic resin having therein a single space for passing fluid therethrough, it is widely known and practiced to heat the thermoplastic resin to its flow temperature, or higher temperature, in a conventional extruder or extruders, extrude the thus heated material through a die having an annular slit and thereafter cool the same. In order to cool the still hot and deformable hollow extruded article of thermoplastic synthetic resin into the form of an article having a predetermined inner diameter, it has usually been the practice either to pass the hot and deformable hollow extruded article into a coolant liquid bath or through a cool water shower or to bring the outer surface of such extruded article into contact with the inner surface of a forming box which is externally cooled by a jacket-type cooling means.

For sizing the still hot and deformable hollow member into an end product having predetermined outer and/or inner diameters, use has been made of size control means of the swaging die type, sizing ring type, sizing plate type, outside mandrel type or the like for sizing the outer diameter and the travelling plug type, extended mandrel type, inside mandrel type or the like for sizing the inner diameter, in accordance with the material and the desired dimensions of the end product.

In making a tubular film of thermoplastic synthetic resin, extrusion is effected by extruder devices in the manner described above, whereafter fluid, usually gas, is forced into the interior of the extruded material to inflate it and then fluid, such as air and/or water is caused naturally and/or forcibly to contact the hollow material on its outer surface or on both its outer and inner surfaces.

In the tube-forming operations carried out by extruders and drawing devices, use has been made of a drawing reduction achieved by imposing on the extruded article a drawing velocity higher than the rate of extrusion so as to increase the total length of the product. For tubing of the inflation type, use has been made of an inflation reduction achieved by making the rate of inflation and the drawing velocity higher than the rate of extrusion so as to increase the total area of the product. All these systems known in the prior art are directed to the production of hollow articles having a single cavity therein. It has not been possible to apply such reduction systems to the production of a hollow board comprising two opposed surface walls and integral partition walls interconnecting these two surface walls and dividing the space therebetween into a plurality of cavities.

SUMMARY OF THE INVENTION

The present invention provides improvements in the method for continuously making a hollow board material consisting of two opposed surface walls and integral partition walls interconnecting these two surface walls and dividing the space therebetween into a plurality of cavities. More particularly, the present invention makes it possible to obtain a high productivity of such hollow board material by a process comprising extruding a hollow board member from an extruder having a die provided with an extrusion opening corresponding in shape to the cross-section of said extruded hollow board member, applying to the hot, extruded board a coolant fluid supplied from a modifier device to modify the shape and size of said extruded hollow board member into dimensions and to dispose same at an angle suitable for entering between a pair of opposed, size formers, moving said hollow board member between said formers, forcing liquid or gaseous fluid through passageways in the core of said die and thence into the cavities of said hollow board member to bring the outer surfaces of said board member into contact with the inner surfaces of said size formers to thereby cool said hollow board member and to control the size and wall thickness thereof and then subjecting the resulting hollow board member to drawing.

It is an object of the present invention to more readily shape a hot and deformable hollow board material extruded from the die opening of an extruder device into a hollow board having a thickness smaller than that of the freshly extruded hollow board material.

It is another object of the present invention to more readily make a hollow board having a thickness smaller than the thickness of the freshly extruded board material, by forcing fluid into the cavities of a hot and deformable hollow board extruded from the die opening to effectively size and cool it in opposed, sizing-cooling devices or "formers".

It is still another object of the present invention to provide a hollow board having good-looking surfaces free of flaws or scratches formed longitudinally thereof after the hollow board is extruded through the die opening of the extruder and cooled and sized into a thickness smaller than that which it had when it emerged from the die opening.

It is yet another object of the present invention to provide an increased total area of the board product by using an extruder and identical "formers."

BRIEF DESCRIPTION OF THE DRAWINGS

The above objects and features of the present invention will become more apparent from the following detailed description of various embodiments thereof, when taken in conjunction with the accompanying drawings, in which.

DESCRIPTION OF THE PREFERRED EMBODIMENTS

Figure 1:
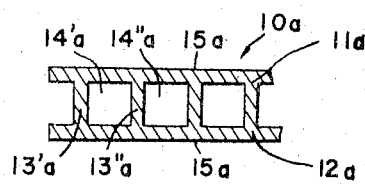
FIG. 1 and FIG. 2 are each, respectively, a fragmentary, enlarged, cross-sectional view of hollow board articles produced according to two embodiments of the present invention.

When the thermoplastic synthetic resin heated to its flow temperature is shaped by extruding the resin through the die of an extruder, the hot molten resin passing through the extruder and through the die opening has its chain of molecules oriented in the direction of flow, but when the molten resin emerges through the die opening and becomes free of the high extrusion pressure, the rheological property of the resin causes swelling or expansion of the freshly extruded article in a direction perpendicular to the direction of flow or movement.

Such swelling is especially conspicuous when the rate of extrusion per extruder is increased in order to obtain an increased ouput. If the resin emerging in a deformable state from an annular extrusion opening is formed into a pipe or tube having an outer diameter larger than the inner diameter of the extrusion opening, the swelling will not constitute a serious problem. On the contrary, if the resin is to be formed into a pipe or tube having an outer diameter smaller than the inner diameter of the extrusion opening, the described swelling will result in some serious problems.

When the smaller diameter pipe or tube is to be provided with a greater length by drawing same, the draw reduction involved therefor is a reduction of concentric dimensions and, therefore, the outer and inner diameters of the pipe or tube can be readily reduced respectively by the previously described external dimension control devices, such as the swaging die type, sizing die type or the like and by the previously described internal dimension control devices of the extending mandrel type, inside mandrel type or the like, such dimension control devices being so disposed as to forcibly control the dimensions of the pipe or tube passing therethrough. However, such a method encounters difficulties when it is employed for the formation of a hollow board having therein a number of small spaces separated from one another by partition walls. The present invention overcomes these difficulties and provides a method of easily making a hollow board whose interior is divided into a number of small spaces or cavities by partition walls. The invention will be described hereunder with respect to some preferred embodiments thereof shown in the drawings.

The product obtained by the method and apparatus of the present invention may be composed of thermoplastic synthetic resin including polyethylene, polypropylene, vinyl chloride and other materials suitable for extrusion molding. As shown in the cross-sectional views of FIG. 1 and FIG. 2, the product of the present invention is a hollow board article generally indicated by and comprising two opposed surface walls 11a and 12a (or, 11b and 12b), a number of partition walls 13'a, 13''a (or 13'b, 13''b) and so on interconnecting the surface walls, the product having a number of small longitudinally extending cavities 14'a, 14''a, (or 14'b, 14''b) and so on defined by the surface walls and the partition walls.

Figure 2:
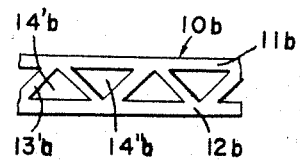
Figure 3:
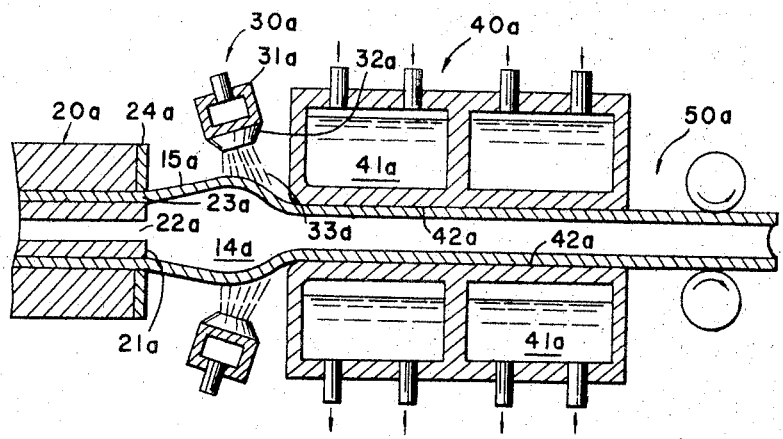
FIG. 3 is a schematic longitudinal section of an apparatus according to one embodiment of the present invention in which pressurized fluid is blown from nozzles against the opposite side surfaces of the hollow board while it is in a deformable state and before it enters the "formers", to thereby vary the thickness of the hollow board.
Figure 4:
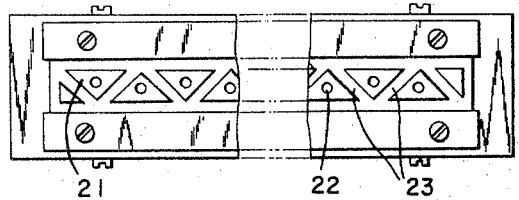
FIG. 4 is a front elevation view of the extrusion die of a machine for producing hollow board article having a cross-section as shown in FIG. 2.
Figure 5:
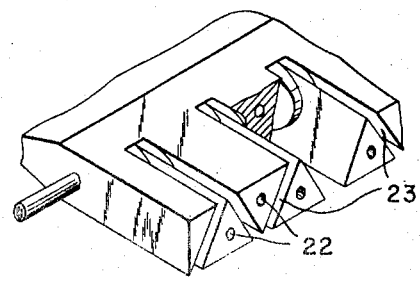
FIG. 5 is a perspective view of the core of the extrusion die divided into mandrels and constituting part of the extruding machine shown in FIG. 4.

Referring to FIG. 3, FIG. 4 and FIG. 5, there is shown one embodiment of the present invention for producing a board of the shape illustrated in FIG. 2.

An extruder of any suitable type is provided with a die 20a having cores 21a transversely spaced apart to define slits 23a corresponding to the partition walls 13'b, etc. of the hollow board article 10b.

A charge of thermoplastic synthetic resin is stirred and heated in the extruder and emerges in a molten state through the slits 23a while taking the form of a hollow board. Compressed fluid, most economically compressed air, is introduced through fluid passageways 22a in the die 20a into the respective cavities 14 formed in the molten hollow board to thereby prevent the collapse of the still hot and deformable hollow board. Care should be taken to adjust the pressure of the introduced fluid to an optimum level because too high a pressure of the fluid would fracture the outer layers of the hollow board. A pair of "formers" 40a made of metal is provided to cool and form the molten hollow board into predetermined dimensions. Each of these "formers" 40a has cooling cavities 41a formed in the outer part thereof to circulate coolant liquid therethrough so as to cool the inner wall 42a of each former and, consequently, the hollow board passing in contact therewith. The compressed fluid introduced into the cavities of the hollow board acts to maintain the outer surface 15a of the hollow board in contact with the inner surfaces 42a of the formers 40a to thereby enhance the cooling effect of the formers. Such contact serves to determine the thickness of the hollow board in accordance with the spacing between the inner surfaces 42a of the formers 40a. The spacing between the inner surfaces 42a may be less than the outer dimensions of the die opening in order that the molten hollow board emerging from the die may be formed into a greater length (longitudinally stretched) hollow product by using a draw reduction. The hollow product thus cooled and formed by the formers is removed by a drawing device or devices 50a, which are adapted to draw the hollow board at a velocity faster than the velocity at which it emerges from the die, so as to provide a greater length of the product.

A pair of "modifiers" generally indicated by 30a is disposed between the die device 20a and the formers 40a and communicates with a source (not shown) of compressed fluid, the modifiers comprise a pair of fluid supply means 31a disposed in opposed relationship with each other so that the hot deformable hollow board material passes therebetween after emerging from the die. Each of the fluid supply means 31a is provided with a row of nozzles 32a through which a stream of fluid 33a having a dynamic pressure is blown against the hot deformable hollow board as it passes from the die to the formers. The stream of fluid 33a may economically be air or water or a mixture thereof.

In the above-described apparatus for producing a hollow board structure, the hollow board emerging from the die undergoes a pronounced inflation due both to the action of the compressed fluid introduced into the cavities 14a thereof and to the swelling phenomenon.

Figure 9:
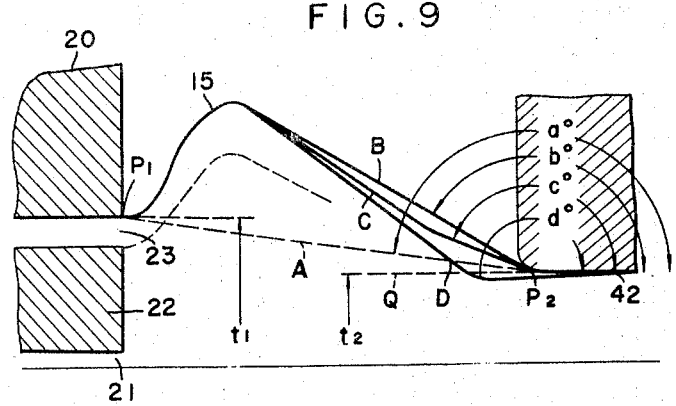
" and FIG. 9 diagrammatically illustrates the manner in which the deformable hollow board emerging from the die of the extruder enters the "formers" while being deformed by fluid pressure.

Such inflation will be greater if the rate of extrusion from the extruder is increased to provide an increased output. Such inflation of the extruded material may cause numerous problems at the entrance to the formers when the spacing between the formers is smaller than the outer dimensions of the die opening so as to produce a thinner product, as shown in FIG. 3. These problems may be solved by the modifiers 30a provided between the die device 20a and the formers 40a, as will be described hereunder with respect to FIGS. 3 and 9.

When a hollow product having a thickness $t_2$ smaller than the outer dimensions $t_1$ of each die slit 23a is to be produced, the angle of entry $a°$, that is, the angle at which a line A, which extends between the outermost edge P1 of the die slit and the foremost edge P2 of the "former," intersects a line Q corresponding to the inner surface of the "former" at the point P2, is smaller than 180°, even if no inflation occurs in the molten hollow board emerging from the die. Thus, there is created such a great friction at the point P2 between the outer surface 15 of hot deformable hollow board and the inner surface 42$^a$ of the former 40a that the outer surface of the hot deformable hollow board not only is damaged in its direction of movement to reduce the quality of the end product but also the tackiness of the deformable hollow board tends to cause adherence thereof to the forward end and/or the inner surface of the "former" to interfere with the production process. If some inflation of the extruded material is caused due to an increased rate of extrusion for an increased production and due to the fluid forcibly introduced into the cavities of the deformable hot hollow board to maintain contact of the outer surface thereof with the inner surface of the "former," the outer surface of the hollow board will move along a line, such as B, so that the angle of entry $b°$ then is much smaller than 180°, thereby to greatly increase the probability that the aforesaid trouble will occur. If the drawing velocity of the drawing device 50a is increased to provide a higher rate of production, the friction at the point P2 will proportionally increase, thereby further increasing the probability of trouble.

According to the present invention, the outer surfaces of deformable hollow board are deformed by being brought, not into direct contact with the solid material of the formers, but rather, into contact with the fluid before the board contacts the forward end and/or the inner surfaces of the formers, so that the deformable hollow board can enter the formers with an enlarged angle of entry (greater than $a°$) which reduces the probability of the occurrence of the afore mentioned trouble resulting from the friction between the outer surface of the formers.

Assuming that the extruded hollow board is inflated due to an increased rate of production and moves along the line B at the angle of entry $b°$, the line of moving B is caused to shift to a line C forming an angle of entry $c°$, greater than the angle $b°$, by the stream of fluid 33a blown under great dynamic pressure against the outer surfaces of the hollow board from the supply means 31a through the row of nozzles 32a, thereby reducing the probability of the occurrence of the aforesaid trouble. If the movement of the outer surface of the deformable hollow board is caused to further shift to a line D by further increasing the dynamic pressure of the stream of fluid blown from the supply means 31a to thereby provide a further angle of entry $d°$, greater than 180°, the problem of the friction at the point P2 will be nullified to extremely reduce the probability of trouble occurring, although the outer surfaces of the hollow board will only slightly contact the inner surfaces of the formers.

In this way, the modifiers shown in FIG. 3 are useful to reduce the friction between the extruded hollow board and the formers and, accordingly, reduce the problem resulting from such friction, and in addition, further advantages will be provided as will be described hereunder.

As the force of the fluid blown from the supply means 31a against the surfaces 15a of the hollow board 10a is greater, the hot boundary film of fluid present in the nature of an insulation layer on these surfaces 15a may be removed or reduced in thickness to thereby enhance the cooling effect of the hollow board. For this reason, the fluid blown through the arrangement of FIG. 3 against the outer surfaces 15a of the deformable hollow board with such a great force as to deform the surfaces 15a, also serves to cool the outer surfaces of the deformable hollow board emerging from the die before it contacts the inner surfaces of the formers, whereby a solidified surface layer, which cannot be destroyed by its contact with the inner surfaces of the formers, may be formed on the outer surfaces of the hollow board to eliminate the problem of adherence thereof to the formers due to the tackiness which would otherwise be present on such outer surfaces. In addition, the cooled and solidified layer formed on the outer surfaces of the hollow board provides a smooth surface peculiar to synthetic resin which will serve to reduce the coefficient of friction between the hollow board and the formers, to thereby increase the production capacity. Moreover, such a smooth surface provided by the solidified layer has another advantage in that it prevents any flaws or scratches from being formed on the surfaces of the product in its direction of movement as a result of its contact with the inner surfaces of the formers. A further advantage is that when a draw reduction is used to form the molten hollow board emerging from the die into a product of greater length, the remarkable reduction which may occur in the transverse direction thereof can be prevented by the solidified layers formed on the opposite outer surfaces by the fluid blown thereagainst under great dynamic pressure in the described manner, thereby helping to increase the total area of the product produced by the draw reduction.

Figure 6:
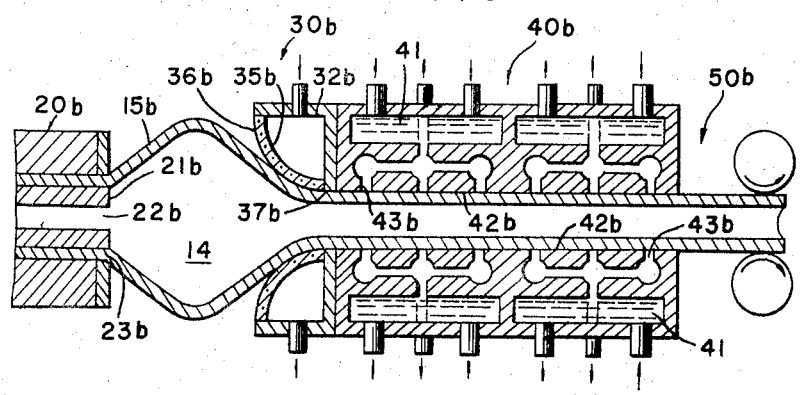
FIG. 6 is a schematic longitudinal sectional view of an apparatus according to another embodiment of the present invention in which the thickness of the hollow board in a deformable state is varied by a non-contact type size modifiers disposed forwardly of and adjacent to the "formers."

Referring to FIG. 6, there is shown another embodiment of the present invention. A die $20b$ is provided with cores $21b$ having therein a fluid passageway $22b$ and disposed so as to define slits $23b$ having a cross section corresponding to the predetermined cross-sectional shape of the hollow board 10 having partition-walls 13. A charge of thermoplastic synthetic resin is extruded in the form of a hot deformable hollow board through the die $20b$ while a fluid under pressure is forced into the cavities 14 of the hollow board 10 through the passageway $22b$. A pair of modifiers $30b$ provided with porous, fluid supply means $32b$ is disposed in suitably spaced relationship with the die $20b$ so as to force coolant fluid into contact with the outer surfaces $15b$ of the deformable hollow board. The inner part $35b$ of each fluid supply means $32b$ which is opposed to the hollow board is formed of sintered alloy or porous ceramic material or the like so that coolant fluid introduced under pressure from a source of compressed fluid (not shown) into the supply means $32b$ may pass through the porous material thereof to ooze through the entire inner surface $36b$, thereby forcibly interposing the oozed coolant fluid, under static pressure, between the inner surfaces $36b$ of the supply means $32b$ and the outer surfaces $15b$ of the deformable hollow board 10 to prevent a direct contact therebetween. The oozed coolant fluid preferably is air or water for economic reasons.

Downstream of and contiguously with the modifiers $30b$, there is disposed one or more pairs of "formers" $40b$ each having an outer cavity 41 for circulating therein a cooling medium so as to cool the inner part of the formers $40b$. The inner surfaces $42b$ of the formers $40b$ thereby cool the hollow board 10. Suction passages $43b$ are provided in the "formers" to assist in maintaining the board in contact with the surface $42b$ and to withdraw the cooling fluid travelling with the board product.

Preferably, the inner surfaces $36b$ of the supply means $32b$ may have a suitable curvature in such a manner that the rearmost end $37b$ of the surface $36b$ is flush with the inner surface $42b$ of the former $40b$.

When the rate of extrusion is increased to cause the extruded material to present an increased inflation and when the drawing velocity is also increased, the embodiment of FIG. 3 produces a greater friction between the outer surfaces $15b$ of the hollow board and the foremost end of each former $40a$, whereas in the embodiment FIG. 6 now under discussion the modifiers $30b$ also serves as guides and the coolant fluid present between the suitably curved inner surfaces $36b$ of the supply means $32b$ and the outer surfaces $15b$ of the deformable hollow board prevents any direct contact and friction from arising between these surfaces $15b$ and $36b$. Thus, the deformable hollow board can move along the guides smoothly to enter the formers $40b$. In addition, the coolant fluid present between the surfaces $15b$ and $36b$ serves to cool the hollow board, thereby providing the advantage that the hot and tacky surfaces $15b$ of the hollow board lose tackiness which would otherwise result in adherence of the surfaces $15b$ to the inner surfaces $36b$ of the formers $40b$. The outer surfaces $15b$ of the hollow board thus cooled by the coolant fluid provide solidified surfaces which will not be injured, either by the friction contact thereof with the inner surfaces of the formers or by the attraction thereof to these surfaces due to the suction port $43b$ formed therein.

Also, the outer surfaces $15b$ of the hollow board hardened by the coolant fluid has the advantage that they prevent the transverse dimensional reduction which may arise from the draw reduction as described, thereby preventing a reduction in the total area of the product.

A further advantage of the present embodiment is that when the cavities 14 formed in the hollow board are so small in dimension as to necessitate the use of the attraction type cooler-former devices $40a$ instead of an extend mandrel, inside mandrel or the like, all or some of the cooling fluid forced to contact the outer surfaces of the hollow board by the modifiers moves therewith into the formers so as to act as a lubricant for preventing friction between the outer surfaces of the hollow board and the inner surfaces of the formers, thus ensuring smooth passage and production of the hollow board.

Figure 7:
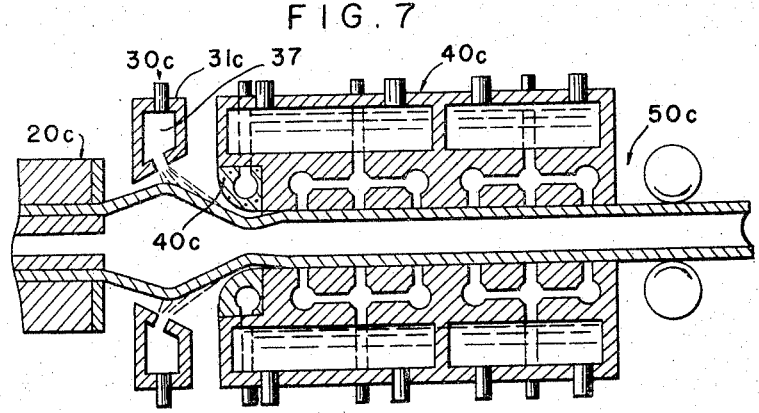
FIG. 7 schematically shows a longitudinal cross section of an apparatus according to still another embodiment of the present invention in which sheets of fluid are blown through narrow slits having a length corresponding to the width of the extrusion die against the opposite side surfaces of the hollow board when it is in a deformable state before entering the "formers," while a fluid pressure is applied to the deformable hollow board by non-contact type size modifiers disposed at the forward end of the "formers," to thereby facilitate the entry of the hollow board into the "formers."

Still another advantage of the present embodiment is that when a stream of fluid as shown in FIG. 3 or a sheet of fluid as shown in FIG. 7 is blown against the outer surfaces of the hot deformable hollow board, any abnormal deformation of the hollow board and accordingly any operational trouble and unsatisfactory end product can be obviated irrespective of misadjusted fluid pressure and flow rate which may often take place in such a case.

Referring to FIG. 7, there is shown still another embodiment of the present invention. A pair of modifiers $30c$ each provided with supply means $31c$ having a narrow slit 37 equal in length to the width of the die $20c$ or the hollow board extruded therefrom are disposed in opposed relationship with each other for blowing sheets of coolant fluid toward the points at which the inflated hollow board enters the formers $40c$ similar to that shown in FIG. 3. Also provided downstream of the modifiers $30c$ are a pair of oozing type modifiers similar to those shown in FIG. 6. These two pairs of different modifiers ensure that the advantages of the FIG. 3 and FIG. 6 embodiments, described above, will be attained more reliably.

Figure 8:
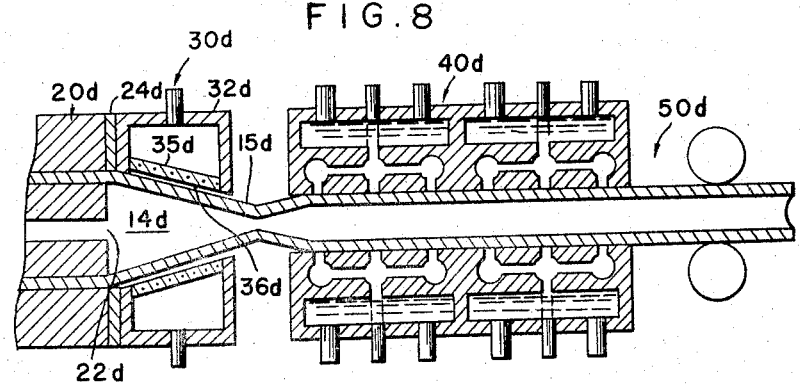
FIG. 8 schematically shows a longitudinal cross section of an apparatus according to yet another embodiment of the present invention in which the hollow board in a deformable state is deformed by pressure applied thereto from non-contact type size modifiers provided downstream of and contiguous with the die, to thereby facilitate the entry of the deformable hollow board into the "formers.

Yet another embodiment of the present invention is shown in FIG. 8. A pair of modifiers $30d$ each provided with supply means $32d$ having the inner parts $35d$ thereof formed of porous ceramic, sintered alloy or the like, so as to allow coolant fluid to ooze therethrough, are connected to a die $20d$ by means of heat insulators $24d$ and are opposed to each other so that the hollow board from the die passes therebetween. The inner surfaces $36d$ of these modifiers $30d$ at the upstream end thereof are spaced apart from each other a distance equal to or slightly greater than the outer dimensions of the die slits while the inner surfaces $36d$ at the rearmost end thereof are spaced apart from each other a distance equal to or slightly smaller than the spacing between the subsequent formers $40d$, so that the inner surfaces $36d$ of the two modifiers $30d$ define therebetween a gradually reduced or tapered passageway. Coolant fluid supplied from a source of compressed fluid to each supply device $32d$ is forced to ooze through the inner surface 36d thereof so as to become present between the surfaces 36d and the outer surfaces 15d of the hot deformable hollow board emerging from the die 20d, thereby preventing direct contact between the surfaces 15d and 36d. Since the modifiers 30d are connected to the die 20d by means of heat insulators 24d as mentioned above, the hollow board 10 undergoes no inflation even if a filler, usually air, is forced from a filler passage 22d into the cavities 14d of the hollow board, and thus the hollow board 10 can be smoothly drawn into formers 40d by the drawing device or devices 50d while the thickness of the hollow board is made equal to or smaller than the spacing between the formers 40d. According to this embodiment, the deformable hollow board emerging from the die is directly formed into a hollow end product and this is a highly productive method of making a hollow article which also has the excellent advantages of the various embodiments described hereinabove.

The embodiments of the invention in which an exclusive property or privilege is claimed are defined as follows:

1. Method of making a hollow board article of thermoplastic synthetic moldable resin, said board article having spaced-apart, opposite surface walls and integral internal partition walls dividing the zone between said surface walls into a plurality of similarly oriented cavities, employing an extruder having a die provided with cores therein and defining a die opening corresponding in shape to the cross-section of the board article, the opposite edges of said die opening for shaping the external surfaces of said surface walls being spaced apart a distance larger than the spacing of said external surfaces of the board article to be produced, and a pair of opposed, elongated, cooled formers spaced from said die, said formers having opposing elongated inner surfaces spaced apart a distance corresponding to the spacing of said external surfaces of the board article to be produced, said inner surfaces of said formers defining an elongated forming zone substantially coaxial with and spaced from said die, the space between said die and said formers defining a modifying zone, which method comprises the steps of:

continuously extruding from said die into said modifying zone a hot, deformable board member whose external surfaces are spaced apart a distance larger than the spacing between said inner surfaces of said formers, and simultaneously forcing pressurized fluid into the cavities of said hot deformable board member to prevent collapse of said hot deformable board member;

in the modifying zone wherein said board member is externally and internally unconfined, continuously directing streams of pressurized cooling fluid in substantially opposite directions directly against both of said external surfaces of said hot, deformable board member to deform said board member and to effect accelerated cooling of the external surfaces thereof to substantially solidify same and reduce the tackiness thereof before said board member enters said forming zone whereby said external surfaces become smooth and have a low coefficient of friction with said formers, said streams having dynamic pressures effective for continuously deforming said hot deformable board member and moving said external surfaces thereof toward each other so that said external surfaces lie inside of imaginary straight lines extending between said edges of said die opening and the adjacent ends of said inner surfaces of said formers, just before said hot deformable board member enters said forming zone; and then continuously drawing said hot deformable board member from said modifying zone directly into and through said forming zone, the fluid in the cavities of said hot deformable board member being effective to maintain the external surfaces thereof in contact with said inner surfaces of said formers, whereby said hollow board member is cooled and sized as it passes through the forming zone thereby to produce a rigidified board article of controlled dimensions.

2. A method according to claim 1, in which the distance between said external surfaces of said hot deformable board member is less than the distance between said inner surfaces of said formers by the time said hot deformable board member is about to enter said forming zone.

3. Method of making a hollow board article of thermoplastic synthetic moldable resin, said board article having spaced-apart, opposite surface walls and integral internal partition walls dividing the zone between said surface walls into a plurality of similarly oriented cavities, employing an extruder having a die provided with cores therein and defining a die opening corresponding in shape to the cross-section of the board article, the opposite edges of said die opening for shaping the external surfaces of said surface walls being spaced apart a distance larger than the spacing of said external surfaces of the board article to be produced, and a pair of opposed, elongated, cooled formers spaced from said die, said formers having opposing inner surfaces spaced apart a distance corresponding to the spacing of said external surfaces of the board article to be produced, said inner surfaces of said formers defining an elongated forming zone substantially coaxial with and spaced from said die, the space between said die and said formers defining a modifying zone, which method comprises the steps of:

continuously extruding from said die into said modifying zone a hot, deformable board member whose external surfaces are spaced apart a distance larger than the spacing between said inner surfaces of said formers, and simultaneously forcing pressurized fluid into the cavities in said hot deformable board member to prevent collapse of said hot deformable board member;

in the modifying zone wherein said board member is internally unconfined, continuously moving said external surfaces of said hot deformable board member between a pair of elongated fluid-pervious modifier members whose opposing elongated inner surfaces define a progressively smoothly narrowing space in the direction of movement of the board member, and simultaneously flowing streams of pressurized cooling fluid through said modifier members along the entire length of said space so that layers of cooling fluid are continuously present on the opposing inner surfaces of said modifier members to prevent direct contact between the external surfaces of the board member and said inner surfaces of said modifier members and to effect accelerated cooling of the external surfaces of said board member to substantially solidify same and reduce the tackiness thereof before said board member enters said forming zone whereby said external surfaces become smooth and have a low coefficient of friction with said formers, the modifier members and the layers of cooling fluid continuously deforming said hot deformable board member by moving the external surfaces thereof toward each other so that the distance between said external surfaces is not greater than the distance between said inner surfaces of said formers by the time said hot deformable board member is about to enter said forming zone; and then continuously drawing said hot deformable board member into and through said forming zone, the fluid in the cavities of said hot deformable board member being effective to maintain the external surfaces thereof in contact with said inner surfaces of said formers, whereby said hollow board member is cooled and sized as it passes through the forming zone thereby to produce a rigidified board article of controlled dimensions.

4. A method according to claim 3, in which the board member moves from said modifying members directly into the forming zone.

5. A method according to claim 4, including the additional step of directing streams of pressurized cooling fluid in substantially opposite directions directly against both of said external surfaces of said hot, deformable board member before it passes between said modifier members, said streams having dynamic pressures effective for deforming said hot deformable board member and moving the external surfaces thereof toward each other.

6. A method according to claim 3, in which the hot deformable board member moves from said die directly between said modifying members, and said modifying members and layers of cooling fluid are effective to move the external surfaces of the hot deformable board member toward each other so that, when the board member leaves said modifying members, the distance between said external surfaces is less than the distance between said inner surfaces of said formers.

* * * * *